United States Patent [19]

Schiebelhuth et al.

[11] Patent Number: 4,599,003
[45] Date of Patent: Jul. 8, 1986

[54] MULTIPURPOSE KITCHEN MACHINE WITH WORKING CONTAINER

[75] Inventors: Heinz Schiebelhuth, Frankfurt am Main; Wolfgang Franke, Langen; Hartwig Kahlcke, Kronberg; Günter Oppermann, Dietzenbach, all of Fed. Rep. of Germany

[73] Assignee: Braun Aktiengesellschaft, Kronberg, Fed. Rep. of Germany

[21] Appl. No.: 693,563

[22] Filed: Jan. 22, 1985

[30] Foreign Application Priority Data

Feb. 7, 1984 [DE] Fed. Rep. of Germany ....... 3404249

[51] Int. Cl.$^4$ ................................................ B01F 7/30
[52] U.S. Cl. .................................... 366/241; 366/204; 366/288
[58] Field of Search ............... 366/287, 288, 276, 314, 366/204, 205, 241, 279, 348, 349; 241/92, 282.1

[56] References Cited

U.S. PATENT DOCUMENTS

| 2,793,839 | 5/1957 | Kaufman . | |
| 3,169,395 | 2/1965 | Enoch | 366/287 |
| 3,272,481 | 9/1966 | Nauta | 366/287 |
| 4,194,697 | 3/1980 | Lembeck | 366/314 |

FOREIGN PATENT DOCUMENTS

| 362097 | 4/1981 | Austria . |
| 1891126 | 4/1964 | Fed. Rep. of Germany . |
| 3220449 | 12/1983 | Fed. Rep. of Germany . |
| 763806 | 12/1956 | United Kingdom . |

Primary Examiner—Robert W. Jenkins

[57] ABSTRACT

A multipurpose kitchen machine is proposed which, in order to increase its usefulness, in addition to its working container has at least one inner container insertable into said working container, said inner container increasing the efficiency of food processing, especially for small batches, by adjustment to individual tool shapes, and facilitates separate processing of different food batches. A special lid can be used to seal both the inner container when placed in the working container and both containers individually.

4 Claims, 7 Drawing Figures

MULTIPURPOSE KITCHEN MACHINE WITH WORKING CONTAINER

BACKGROUND OF THE INVENTION

The invention relates to a multipurpose kitchen machine with a working container for receiving the food to be processed and an interchangeable rotating tool, driven by an electric motor and projecting into the working container.

A plurality of such kitchen machines are known which have in common the fact that the electric motor drive and the working container are releasably connected to form one unit during use, from which unit the working container can be disconnected for emptying, refilling, and cleaning by a few motions of the hand. The machines can optionally be equipped with various tools for performing the various jobs which can be done with them, such as mixing, cutting, stirring, beating, or kneading. The driving motion is transmitted from the electric motor to the interchangeable tool in question either from above by means of drive elements housed in a removable or foldable arm which projects over the upper edge of the working container in the direction of its interior, or from below by means of a drive shaft which is guided upward through a vertical dome formed concentrically with respect to the central axis of the working container.

In accordance with the universal nature of these multipurpose kitchen machines, they are generally equipped with a single working container, which is movably mounted or firmly locked to the base or housing of the machine and which receives the food for all the processing steps which can be carried out with the multipurpose kitchen machine in question. Formerly, limitation to this single working container meant that it had to be emptied and cleaned each time after processing a batch of food, before another batch with a different taste could be processed. This proved to be especially burdensome because of the effort and time involved when these various batches were components of a given recipe and had to be combined after their separate processing to form a complete dish. Mention is made only by way of example in this connection of recipes in which initially both stiffly beaten egg whites or whipped cream and a mixture of various ingredients, for a cake batter, is to be prepared, and then the two components, i.e. for example the egg white and the batter mixture, have to be combined with each other.

Another disadvantage of conventional working containers which has been accepted heretofore in the interests of the universality of multipurpose kitchen machines is that they contained a suitable working container which, although it was sufficient for the majority of interchangeable tools used and the extremely different types of foods to be processed, could only be a compromise as far as specific requirements were concerned, e.g. preparing egg whites or processing extremely small batches. The possibility of equipping every kitchen machine with at least one additional special working container has heretofore been a possible solution to the problem only in exceptional cases if only for cost reasons, since the manufacturing costs of the known working containers have imposed a considerable additional burden on the purchaser because of the high quality requirements imposed on them as regards safety and lifetime. In addition, storing additional working containers of the conventional type generally poses problems due to space limitations in the kitchen.

Summary of the Invention

Therefore, the goal was to develop a multipurpose kitchen machine which, while retaining the advantageous universal basic concept of such devices, avoids or overcomes the above-listed disadvantages of a single working container as regards the ingredients of a recipe which must be processed in several batches and/or as regards the adaptation of the interior of the container to the working area of special processing tools.

The inner container which is proposed according to the invention and fits into the working container offers the following important advantages:

- It permits separate processing of an additional recipe batch which, after its preparation, can be lifted together with the inner container out of the working container and set aside until the other recipe batch has been prepared in the working container.
- Because the interior of the inner container, in a preferred embodiment of the invention, roughly corresponds to the so-called working area of at least one of the interchangeable tools, the tools in question operate in this inner container with especially high efficiency, even when they are filled with extremely small amounts. The term "working space" refers to the space which the active parts of the rotating working tool traverse in the course of their normal operating motion.
- The inner container according to the invention is a relatively simple molded part which can be much more cost-effective as regards its material and manufacturing cost than the working container proper.
- The inner container according to the invention requires no additional storage space, since it fits into the working container after use and can be put away with the complete kitchen machine.

The required fastening of the inner container in the working container is accomplished with the aid of projections, preferably made somewhat wedge-shaped, with which the inner container is provided on the outside of the upper edge area of its outside wall, and which lock it positively or nonpositively into the working container. It is especially advantageous to make the inner container in the shape of a circular trough open at the top, since this design very frequently corresponds to the so-called working area of at least one of the interchangeable tools. An inner container with this design can advantageously also be combined with a working container which likewise has the shape of a circular trough open at the top, especially if the working container, in known fashion, comprises a centrally disposed vertical dome, open at the top, to allow a shaft to pass through, which receives and drives the interchangeable too. In this embodiment of the invention, in which the upper edge of said dome generally lies below the upper edge of the outside wall of the working container, it is advantageous to adapt the inner container to the working container in such fashion that both its outside wall and its inside wall project above said dome up to no higher than the level of the outside wall of the working container, whereby the height of the inside wall of the inner container is no greater than that of its outside wall and preferably is the same as the latter; as a result, the fit of the inner container into the working container is optimally ensured, as is the possibility of receiving larger filling quantities in the inner container.

Continuing to develop the idea of the invention further, the multipurpose kitchen machine can additionally be equipped with at least one additional inner container which, in turn, can be inserted into the first inner container by suitable design, especially by reducing its size. In a preferred embodiment of the invention, provision is made for adjusting the inside wall of the inner container or containers with respect to their diameter, height, cross-sectional shape, or other form to the coupling parts of the tools in such fashion that each inner container will accept only the tool or tools which fit it or them.

Another advantageous embodiment of the invention consists in equipping the multipurpose kitchen machine with a lid by means of which both the working container and the inner container can be sealed. Preferably, this lid has at its center a roughly conical projection extending into the working container and/or the inner container, the diameter of said projection, at the level of the upper opening of the inner dome of the working container, being equal to the inside diameter of this opening when the lid is in the working position. This conical projection creates the requirement that the lid according to the invention must always seal the upper opening of the dome which projects into the working container. This measure can advantageously be enhanced by virtue of the fact that with the inner container fitted into the working container and with the lid mounted in the working position on these two containers, the diameter of the conical projection at the level of the upper opening of the tubular or bottleneck-shaped inside wall of the inner container is the same as the inside diameter of this opening as well.

BRIEF DESCRIPTION OF THE DRAWING

The invention both as to its organization and principles of operation, together with further objects and advantages thereof, may better be understood by referring to the following detailed description of embodiments of the invention taken in conjunction with the accompanying drawing in which.

DETAILED DESCRIPTION

Figure 1A:
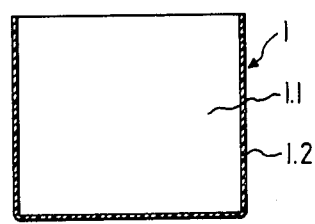
FIG. 1a is a sectional view of a working container, in accordance with this invention.
Figure 1B:
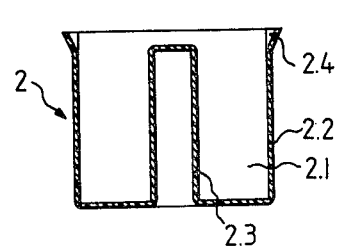
FIG. 1b is a sectional view of an inner container, in accordance with this invention.

FIG. 1a shows a working container 1 in the shape of a conventional mixing bowl open at the top, in whose interior 1.1 a tool driven from above can be inserted. FIG. 1b shows an inner container 2 according to the invention, whose interior 2.1 in the example shown is made in the form of a circular trough open at the top and having wedge-shaped projections 2.4 on the outside of the upper edge area of its outside wall 2.2. When this inner container is inserted into the working container shown in FIG. 1a, it is positively locked to this outside wall 1.2 by means of projections 2.4, which extend slightly radially beyond the inside diameter of outside wall 1.2 of working container 1. This locking action prevents tool 3, shown in FIG. 1c and set rotating via drive shaft 4 by the electric motor, not shown, from transmitting its rotary motion via the food product being processed to inner container 2, driving it as well. The drive arm which transmits the rotary motion of drive shaft 4 to tool 3 can also comprise transmission elements, well known in the art, which set tool 3 rotating about its vertical axis, said rotation being superimposed on the rotary motion of shaft 4, specifically with a much higher rpm than the latter.

Figure 1C:
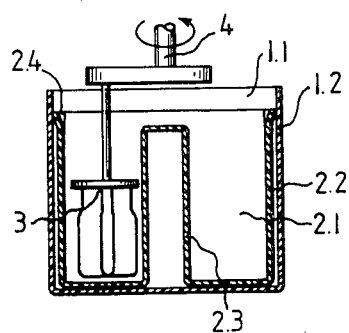
FIG. 1c is a sectional view of an assembled kitchen machine, in accordance with this invention.

FIGS. 2a to 2d show how the design according to the invention can be implemented in a multipurpose kitchen machine, whose drive shaft, powered by an electric motor, is brought upward from below through the working container (corresponding parts have been given the same reference numbers as in FIGS. 1a to 1c):

Working container 1 in this case has a vertical dome 1.3 to allow the drive shaft to pass through, the height of said dome in the example shown being much less than the height of outside wall 1.2. FIG. 2b shows a corresponding inner container 2 according to the present invention with a matching circular trough-shaped interior 2.1, tubular inside wall 2.3, and an outside wall 2.2 whose upper edge bears the locking projections 2.4. In FIG. 2d, as in FIG. 1c, it is readily apparent that the interior 2.1 of the inner container 2 shown matches the working space of tool 3 according to the definition given above, so that tool 3 passes through the entire interior 2.1 without leaving any dead spaces in which the food is insufficiently processed.

Figure 2A:
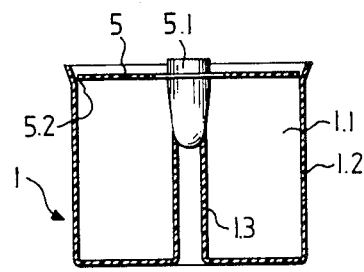
FIG. 2a is a sectional view of a second embodiment of a working container, in accordance with this invention.
Figure 2B:
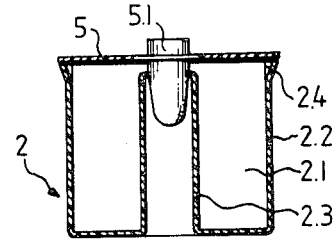
FIG. 2b is a sectional view of a second embodiment of an inner container, in accordance with this invention.
Figure 2C:
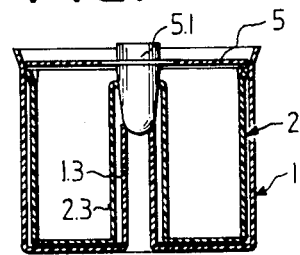
FIG. 2c is a sectional view of the inner container of FIG. 2b assembled in the working container of FIG. 2a, in accordance with this invention.
Figure 2D:
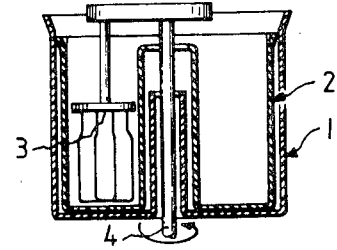
FIG. 2d is a sectional view of a second embodiment of an assembled kitchen machine, in accordance with this invention.

FIGS. 2a to 2c also clearly illustrate the features and function of container lid 5, proposed in the present invention, in its various working positions. As can be seen from FIG. 2a, outside edge 5.2 of the lid exactly matches the inside diameter of working container 1, and conical projection 5.1 has a diameter at the level of the upper opening in dome 1.3 which exactly matches the inside diameter of this opening, so that it also seals this opening in the working container off from the outside air. In FIG. 2b, lid 5 seals an inner container 2 according to the invention whose inside wall 2.3 and outside wall 2.2 are of the same height, while fitting flush on their two upper edges. However, it is also possible completely to seal an inner container according to the invention with a similar lid, the tubular inside wall 2.3 of said inner container having a shorter height than inside wall 2.2, provided conical projection 5.1 is so designed that it has the same diameter at the level of the upper opening of tubular inside wall 2.3 as this opening.

We claim:

1. A multipurpose food processing machine, having a motor and a tool, comprising:
a working container having a first circular bottom portion, including a first centrally disposed aperture, said working container including a first outer wall disposed about the circumference of said bottom portion, and a first inner wall, having a first open free end, disposed about the circumference of said first aperture and extending into said working container;
an inner container, removably insertable in said working container, having a second circular bottom portion, including a second centrally disposed aperture, said inner container including a second outer wall, having an upper edge, disposed about the circumference of said second bottom portion, and a second inner wall, having a second open free end, disposed about the circumference of said second aperture and extending into said inner container, said second outer wall including a projection means proximate the outside of said upper edge of said second outer wall for fixedly locking said inner container to said working container whereby rotation of said inner container with respect to said working container is prevented; and a coupling means, including a shaft member having a first and second end, said first end of said coupling means being connected to the motor, and said second end of said coupling means being connected to the tool, the tool projecting into the interior of said inner container between said second inner wall and said second outer wall, said shaft member being connected between said first and said second ends of said coupling means and being disposed through said first and second open free ends of said first and second inner walls, respectively.

2. The machine as in claim 1 wherein said projection means is of a general wedge shape.

3. The machine as in claim 2 wherein the height of said first inner wall of said working container is less than the height of said first outer wall of said working container and wherein the height of said second outer wall and said second inner wall of said inner container is greater or equal to the height of said first inner wall of said working container and said second outer wall is greater or equal to the height of said second inner wall of said inner container.

4. The machine as in claim 3 further including a circular removable lid means having a diameter at least equal to the outside diameter of said inner container and including an edge portion disposed about the periphery of said lid means extending to and abutting said first outer wall of said working container, said lid means including a centrally disposed conical member which projects into said first open free end of said first inner wall of said working container and projects into said second open free end of said second inner wall of said inner container, wherein said conical member has substantially the same diameter as the inner diameter of said first free end at a first point and has substantially the same diameter as the inner diameter of said second free end at a second point.

* * * * *